(12) United States Patent
Kobayashi et al.

(10) Patent No.: US 6,589,664 B1
(45) Date of Patent: Jul. 8, 2003

(54) LAMINATED PRODUCTS OF OLEFINIC THERMOPLASTIC ELASTOMER AND CONSTRUCTIONAL GASKETS

(75) Inventors: Kyoko Kobayashi, Chiba (JP); Noboru Sakamaki, Chiba (JP); Akira Uchiyama, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 106 days.

(21) Appl. No.: 09/702,886

(22) Filed: Nov. 1, 2000

(30) Foreign Application Priority Data

Nov. 1, 1999 (JP) .......................... 11-311589
Nov. 1, 1999 (JP) .......................... 11-311602

(51) Int. Cl.⁷ ..................... B32B 25/08; E06B 3/62
(52) U.S. Cl. ............... 428/516; 49/490.1; 277/628; 277/650; 428/122; 428/515; 428/517; 428/519; 428/521
(58) Field of Search ............... 277/628, 650; 428/122, 515, 516, 517, 521, 519; 49/490.1

(56) References Cited

U.S. PATENT DOCUMENTS

| 5,302,463 A | * | 4/1994 | Murata et al. ........... 428/122 |
| 5,378,543 A | | 1/1995 | Murata et al. ........... 428/517 |
| 6,221,963 B1 | | 4/2001 | Kobayashi et al. ....... 525/191 |

FOREIGN PATENT DOCUMENTS

| EP | 0 472 268 | 2/1992 |
| JP | 02-089639 | 3/1990 |
| JP | 02-220844 | 9/1990 |
| JP | 06-136349 | 5/1994 |
| JP | 06-182951 | 7/1994 |

* cited by examiner

Primary Examiner—D. S. Nakarani
(74) Attorney, Agent, or Firm—Birch, Stewart, Kolasch & Birch, LLP (57) ABSTRACT

The present invention relates to a laminate comprising an olefinic thermoplastic elastomer which comprises:

(a) a substratum layer comprising an olefinic thermoplastic elastomer composition (A) having the following characteristics ① to ③:

① 
$$9 \leq Y - 0.43X \leq 27 \qquad (1)$$

wherein X denotes the JIS A-hardness value (a dimensionless value) of the olefinic thermoplastic elastomer composition determined according to the prescription of JIS K6301 and Y represents the compression set value (expressed by %) of the olefinic thermoplastic elastomer composition determined according to the prescription of JIS K6301 under a condition of 70° C. and 22 hours, ② a tensile strength value in the range from 5 to 30 MPa determined according to the prescription of JIS K6301 and ③ an elongation set value of 18% or less determined according to the prescription of JIS K6301, and (b) a surface skin layer comprising an ultra high molecular weight polyolefin composition (B) having an intrinsic viscosity [η] measured in decalin at 135° C. in the range from 3.5 to 8.3 dl/g; and a constructional gasket comprising the olefinic thermoplastic elastomer composition (A).

13 Claims, 3 Drawing Sheets

LAMINATED PRODUCTS OF OLEFINIC THERMOPLASTIC ELASTOMER AND CONSTRUCTIONAL GASKETS

BACKGROUND OF THE INVENTION

The present invention relates to a laminated product comprising a substratum layer of an olefinic thermoplastic elastomer and a surface skin layer, and to a constructional gasket.

A variety of materials have heretofore been employed for parts and portions requiring rubbery elasticity in the field of automobile parts, industrial machinery parts, electric and electronic parts, and constructional materials. For example, for doors, leafs and sashes of buildings there are provided guide members called gasket which facilitate an opening-closing operation for going-in-and-out and for ventilation, and which, moreover, make possible an operation of tightly shutting doors against the portions that come into contact with the doors.

For the gasket to be used for construction, there have heretofore been used mainly soft synthetic resins such as soft poly (vinyl chloride) resin and vulcanized rubbers such as ethylene-propylene-diene copolymer rubber.

Further, for the portions requiring a higher performance of sliding property, special materials have been employed such as foamed silicone rubbers.

The hitherto used gaskets made of soft synthetic resins and made of vulcanized rubber are not particularly superior in sliding property and, hence, their function as gasket tends to be lowered, what with permanent set in fatigue and what with big deformation occurring through a prolonged use. Further, the vulcanized rubber, since being a thermosetting type rubber, cannot be put to recycled use.

Although the above-mentioned problem can be solved by using such a material excellent in sliding property as foamed silicone rubber, the arising problem is that the rubber is expensive compared with generally used soft synthetic resins and vulcanized rubbers.

OBJECTS AND SUMMARY OF THE INVENTION

The first object of the present invention is to provide a constructional gasket excellent in durability, excellent in the property of giving a tight contact upon closing doors or the like and excellent in the property of giving a lilting slide upon opening doors or the like by using an economical and recyclable laminated material.

The second object of the present invention is to provide a constructional gasket superior in durability and in sealing and hermetic property for doors and windows by using an olefinic thermoplastic elastomer composition capable of being reclaimed which can be produced simply without employing a crosslinking agent with a single production process and moreover produced at a low cost.

Namely, the present invention includes the following inventions.

(i) A laminate comprising an olefinic thermoplastic elastomer which comprises:

(a) a substratum layer comprising an olefinic thermoplastic elastomer composition (A) having the following characteristics ① to ③:

①

$$9 \leq Y - 0.43X \leq 27 \quad (1)$$

wherein X denotes the JIS A-hardness value (a dimensionless value) of the olefinic thermoplastic elastomer composition determined according to the prescription of JIS K6301 and Y represents the compression set value (expressed by %) of the olefinic thermoplastic elastomer composition determined according to the prescription of JIS K6301 under a condition of 70° C. and 22 hours, ② a tensile strength value in the range from 5 to 30 MPa determined according to the prescription of JIS K6301 and ③ an elongation set value of 18% or less determined according to the prescription of JIS K6301, and (b) a surface skin layer comprising an ultra high molecular weight polyolefin composition (B) having an intrinsic viscosity [η] measured in decalin at 135° C. in the range from 3.5 to 8.3 dl/g.

(ii) A laminate as defined in the above (i), wherein the olefinic thermoplastic elastomer composition (A) is obtainable by dynamically heat treating 5 to 60 parts by weight of a polyethylene resin (a-1) and 40 to 95 parts by weight of an ethylene-α-olefin-based copolymer (a-2) having a Mooney viscosity $ML_{1+4}$ (100° C.) of 90 to 250 and an ethylene content of 70 to 95 mole % [the total amount of (a-1) and (a-2) being 100 parts by weight.]

(iii) A laminate as defined in the above (i), wherein the olefinic thermoplastic elastomer composition (A) is obtainable by dynamically heat treating 5 to 60 parts by weight of a polypropylene resin (a-3) and 40 to 95 parts by weight of an α-olefin-based copolymer (a-4) having a Mooney viscosity $ML_{1+4}$ (100° C.) of 60 to 250 [the total amount of (a-3) and (a-4) being 100 parts by weight.]

(iv) A laminate as defined in the above (i), wherein the ultra high molecular weight polyolefin composition (B) is an ultra high molecular weight polyolefin composition comprising an ultra high molecular weight polyolefin (b-1) having an intrinsic viscosity [η] measured in decalin at 135° C. in the range from 10 to 40 dl/g and a polyolefin (b-2) having an intrinsic viscosity [η] measured in decalin at 135° C. in the range from 0.1 to 5 dl/g, and the ultra high molecular weight polyolefin (b-1) is present in a ratio of 15 to 40% by weight to the total amount of 100% by weight of the ultra high molecular weight polyolefin (b-1) and the polyolefin (b-2).

(v) A laminate as defined in the above (ii), wherein the olefinic thermoplastic elastomer composition (A) contains 30 parts by weight or less of a polypropylene resin (a-5) to the total amount 100 parts by weight of the polyethylene resin (a-1) and the ethylene-α-olefin-based copolymer (a-2).

(vi) A laminate as defined in any one of the above (i) to (v), wherein the surface skin layer comprising the ultra high molecular weight polyolefin composition (B) is composed of 10 to 90 parts by weight of the ultra high molecular weight polyolefin composition (B) and 90 to 10 parts by weight of an olefinic thermoplastic elastomer composition (C) comprising a crystalline polyolefin resin and a rubber [the total amount of (B) and (C) being 100 parts by weight].

(vii) A laminate as defined in any one of the above (i) to (v), wherein the surface skin layer comprising the ultra high molecular weight polyolefin composition (B) is composed of 10 to 90 parts by weight of the ultra high molecular weight polyolefin composition (B), 90 to 10 parts by weight of the olefinic thermoplastic elastomer composition (C) comprising a crystalline polyolefin resin and a rubber [the total amount of (B) and (C) being 100 parts by weight] and 0.1 to 25 parts by weight of an organopolysiloxane (D).

(viii) A glass-run channel for automobile comprising a laminate as defined in any one of the above (i) to (vii).

(ix) A constructional gasket comprising a laminate as defined in any one of the above (i) to (vii).

(x) A constructional gasket comprising an olefinic thermoplastic elastomer composition (A) having the following characteristics ① to ③:

①
$$9 \leq Y - 0.43X < 27 \quad (1)$$

wherein X denotes the JIS A-hardness value (a dimensionless value) of the olefinic thermoplastic elastomer composition determined according to the prescription of JIS K6301 and Y represents the compression set value (expressed by %) of the olefinic thermoplastic elastomer composition determined according to the prescription of JIS K6301 under a condition of 70° C. and 22 hours, ② a tensile strength value in the range from 5 to 30 MPa determined according to the prescription of JIS K6301 and ③ an elongation set value of 18% or less determined according to the prescription of JIS K6301.

(xi) A constructional gasket as defined in the above (x), wherein the olefinic thermoplastic elastomer composition (A) is obtainable by dynamically heat treating 5 to 60 parts by weight of a polyethylene resin (a-1) and 40 to 95 parts by weight of an ethylene-α-olefin-based copolymer (a-2) having a Mooney viscosity $ML_{1+4}$ (100° C.) of 90 to 250 and an ethylene content of 60 to 95 mole % [the total amount of (a-1) and (a-2) being 100 parts by weight].

(xii) A laminate as defined in the above (x), wherein the olefinic thermoplastic elastomer composition (A) is obtainable by dynamically heat treating 5 to 60 parts by weight of polypropylene resin (a-3) and 40 to 95 parts by weight of an a α-olefin-based copolymer (a-4) having a Mooney viscosity $ML_{1+4}$ (100° C.) of 60 to 250 [the total amount of (a-3) and (a-4) being 100 parts by weight].

(xiii) A constructional gasket as defined in the above (xi), wherein the olefinic thermoplastic elastomer composition (A) contains 30 parts by weight or less of a polypropylene resin (a-5) to the total amount 100 parts by weight of the polyethylene resin (a-1) and the ethylene-α-olefin-based copolymer (a-2).

Hereinafter, the present invention is explained in detail.

The olefinic thermoplastic elastomer based laminate of the present invention is constituted by a substratum layer comprising an olefinic thermoplastic elastomer composition (A) and a surface skin layer comprising a specific ultra high molecular weight polyolefin composition (B).

The above-mentioned components constituting these layers are explained first.

Olefinic Thermoplastic Elastomer Composition (A)

The olefinic thermoplastic elastomer composition (A) used in the present invention is an elastomer having the following characteristics ① to ③:

①
$$9 \leq Y - 0.43X \leq 27 \quad (1)$$

preferably $$9 \leq Y - 0.43X \leq 27 \quad (1')$$

more preferably $$10 \leq Y - 0.43X \leq 26 \quad (1'')$$

wherein X denotes the JIS A-hardness value (a dimensionless value) of the olefinic thermoplastic elastomer composition determined according to the prescription of JIS K6301 and Y represents the compression set value (expressed by %) of the olefinic thermoplastic elastomer composition determined according to the prescription of JIS K6301 under a condition of 70° C. and 22 hours, ② a tensile strength value in the range from 5 to 30 MPa, preferably 8 to 30 MPa, more preferably 12 to 30 MPa determined according to the prescription of JIS K6301, and ③ an elongation set value of 18% or less, preferably 0.5 to 15%, more preferably 0.5 to 12% determined according to the prescription of JIS K6301.

The methods for determining the above characteristics ① to ③ are as follows.

The JIS A-hardness:
Determined according to the prescription of JIS K6301 as an instantaneous value using a Type A hardness tester operated with a spring.

The compression set value:
Determined according to the prescription of JIS K6301 as the permanent set (residual strain) using a stubby cylindrical test specimen having a diameter of 29.0 mm and a thickness of 12.7 mm after the specimen has been held pressed for 22 hours under a condition of 25% compression ×70° C.

The tensile strength:
Determined according to the prescription of JIS K6301 using a JIS No. 3 dumbbell specimen at a drawing velocity of 200 mm/min.

The elongation set value:
Determined according to the prescription of JIS K6301 as the permanent set (residual elongation) using a JIS No. 3 dumbbell specimen after the specimen has been maintained under 100% elongation for 10 minutes and, then, kept for 10 minutes with relieved tension before the determination of the permanent set (residual elongation).

The olefinic thermoplastic elastomer composition (A) used in the present invention is constituted preferably by a polyethylene resin (a-1) and an ethylene-α-olefin-based copolymer (a-2), and a polypropylene resin (a-5) incorporated where deemed necessary.

For the polyethylene resin (a-1) to be employed according to the present invention, known polyethylene resins can be used without any restriction, such as a high density polyethylene, a medium density polyethylene, a low density linear polyethylene and a low density polyethylene, wherein preference is given to low density linear polyethylene, in particular, to that obtained using a metallocene catalyst.

The polyethylene resin (a-1) has preferably a melt flow rate (MFR, determined according to ASTM D1238 at 190° C. under a load of 2.16 kg) of 0.01 to 100 g/10 min., more preferably 0.01 to 50 g/10 min. In using as the polyethylene resin (a-1) an ultra high molecular weight polyethylene having a MFR lower than 0.1 g/10 min., which has ordinarily an intrinsic viscosity [η], determined in decalin at 135° C., in the range from 7 to 40 dl/g, such an ultra high molecular weight polyethylene may preferably be used as a mixture composed of 15 to 40% by weight of a low to high molecular weight polyethylene having an intrinsic viscosity [η], determined in decalin at 135° C., in the range from 0.1 to 5 dl/g and of 85 to 60% by weight of an ultra high molecular weight polyethylene of intrinsic viscosity [η] in the range from 7 to 40 dl/g, wherein the intrinsic viscosity [η] of the mixture as a whole may preferably be in the range from 3.5 to 8.3 dl/g.

The polyethylene resin (a-1) may favorably have a density in the range from 0.88 to 0.98 g/cm$^3$, preferably from 0.90 to 0.95 g/cm$^3$.

When a low density linear polyethylene is to be used for the polyethylene resin (a-1), it is favorable to use one which has an MFR (ASTM D1238, 190° C., load 2.16 kg) of 0.1 to 30 g/10 min., preferably 0.2 to 20 g/10 min., and a density of 0.88 to 0.95 g/cm$^3$, preferably 0.91 to 0.94 g/cm$^3$.

When a low density linear polyethylene is used for the polyethylene resin (a-1), a formed article exhibiting superior appearance can be obtained without occurrence of neither a rough nor sticky surface by extrusion molding or injection molding, as contrasted to the case of using a medium or a high density polyethylene.

The polyethylene resin (a-1) may be either a homopolymer of ethylene or a copolymer of a predominant proportion of ethylene with minor proportion, for example, not higher than 10 mole %, of other comonomer(s). For such comonomers, there may be enumerated α-olefins having 3 to 20 carbon atoms, preferably 3 to 8 carbon atoms, and vinyl monomers, such as vinyl acetate and ethyl acrylate. For the α-olefin to be incorporated as other comonomer, there may be exemplified propylene, 1-butene, 4-methyl-1-pentene, 1-hexene and 1-octene. Such other comonomer may be incorporated either alone or in a combination of two or more.

The polyethylene resin (a-1) may be either one single polyethylene product or a blend of polyethylene products.

The ethylene- α-olefin-based copolymer (a-2) employed in the present invention is one having a Mooney viscosity ML$_{1+4}$ (100° C.) of 90 to 250, preferably 100 to 200, more preferably 110 to 180, and an ethylene content of 70 to 95 mole %, preferably 75 to 90 mole %, more preferably 75 to 85 mole %. Here, the ethylene content indicates an ethylene content to the total content of α-olefins (including ethylene).

The ethylene-α-olefin-based copolymer (a-2) may either be a copolymer of ethylene with an α-olefin having 3 to 20 carbon atoms, preferably 3 to 8 carbon atoms or a copolymer of ethylene, the α-olefin and comonomer(s) other than α-olefins. Such comonomer(s) other than α-olefins may include a non-conjugated polyene. Further, the ethylene-α-olefin-based copolymer (a-2) may either be a random copolymer or a block copolymer.

Concrete examples of the ethylene-α-olefin-based copolymer (a-2) include ethylene-α-olefin copolymers and ethylene-α-olefin-non-conjugated polyene copolymers. Among them, ethylene-α-olefin-non-conjugated polyene copolymers are preferred.

As the α-olefin to be copolymerized with ethylene in the ethylene-α-olefin-based copolymer (a-2), there may be enumerated, for example, propylene, 1-butene, 1-pentene, 4-methyl-1-pentene, 1-hexene and 1-octene. The α-olefin may either be incorporated alone or in a combination of two or more.

As the non-conjugated polyene to be copolymerized with ethylene and α-olefin in the ethylene-α-olefin-based copolymer (a-2), there may be enumerated, for example, non-conjugated diene, such as dicyclopentadiene, 1,4-hexadiene, cyclooctadiene, methylenenorbornene and ethylidenenorbornene. The non-conjugated polyene may either be incorporated alone or in a combination of two or more. The ethylene-α-olefin-non-conjugated polyene copolymer has an iodine value usually in the range of 0.1 to 50, preferably in the range of 5 to 30.

The ethylene-α-olefin-based copolymer (a-2) may either be incorporated alone or in a combination of two or more.

Of the olefinic thermoplastic elastomer composition (A) used in the present invention, a composition composed of the polyethylene resin (a-1) and the ethylene-α-olefin-based copolymer (a-2) is obtained preferably by subjecting a mixture containing 5 to 60% by weight, preferably 10 to 50% by weight of the polyethylene resin (a-1) and 40 to 95% by weight, preferably 50 to 90% by weight of the ethylene-α-olefin-based copolymer (a-2) to the total amount of the polyethylene resin (a-1) and the ethylene-α-olefin-based copolymer (a-2) to a dynamic heat treatment in the absence of crosslinking agent as described below. When the contents of the polyethylene resin (a-1) and the ethylene-α-olefin-based copolymer (a-2) are in the above-mentioned range, superior rubbery elasticity is exhibited.

The olefinic thermoplastic elastomer composition (A) used in the present invention may incorporate a polypropylene resin (a-5). As the polypropylene resin (a-5), every known polypropylene resin can be used without any restriction. Concrete examples therefor include those given below:

1) Homopolymers of propylene
2) Random copolymers of propylene and other α-olefin (s), i.e., propylene-α-olefin random copolymers, in molar proportions in the range of 90 mole % or more for the former and 10 mole % or less for the latter.
3) Block copolymers of propylene and other α-olefin(s), i.e., propylene-α-olefin block copolymers, in molar proportions in the range of 70 mole % or more for the former and 30 mole % or less for the latter.

For the α-olefin to be copolymerized with propylene, there may be exemplified concretely those having 2 to 20 carbon atoms, preferably 2 to 8 carbon atoms, such as ethylene, 1-butene, 4-methyl-1-pentene, 1-hexene and 1-octene.

As the polypropylene resin (a-5), there may favorably be employed homopolymers of propylene of above 1) and propylene-α-olefin random copolymers of above 2), wherein special preference is given to those which have MFR values (ASTM D1238, 230° C., 2.16 kg load) in the range from 0.1 to 50 g/10 min.

The polypropylene resin (a-5) may either be a single polymer product or a blend of polymer products.

The content of the polypropylene resin (a-5) in the olefinic thermoplastic elastomer composition (A) according to the present invention may usually be 30 parts or less by weight, preferably 2 to 30 parts by weight, more preferably 5 to 20 parts by weight per 100 parts by weight of the total amount of the polyethylene resin (a-1) plus the ethylene-α-olefin-based copolymer (a-2).

If the content of the polypropylene (a-5) is in the above range, a formed product exhibiting superior appearance with scarce occurrence of rough or sticky surface can be produced by, for example, extrusion molding and injection molding.

The olefinic thermoplastic elastomer composition (A) used in the present invention may be composed of a polypropylene resin (a-3) and an α-olefin-based copolymer (a-4).

As the polypropylene resin (a-3) to be used in the present invention, there may be enumerated the same as stated previously as the polypropylene resin (a-5). In employing, as the olefinic thermoplastic elastomer composition (A), a combination of an olefinic thermoplastic elastomer composition which is composed of the polypropylene resin (a-3) and the α-olefin-based copolymer (a-4), and an olefinic thermoplastic elastomer composition which is composed of the above polyethylene resin (a-1), the ethylene-α-olefinbased copolymer (a-2) and the polypropylene resin (a-5), the polypropylene resin (a-3) and the polypropylene resin (a-5) may either be identical or different.

The α-olefin-based copolymer (a-4) used in the present invention is one having a Mooney viscosity $ML_{1+4}$ (100° C.) of 60 to 250, preferably 100 to 200, more preferably 110 to 180.

The α-olefin-based copolymer (a-4) is a copolymer comprising at least two kinds of α-olefin having 2 to 20, preferably 2 to 8 carbon atoms and may be copolymerized with comonomer(s) other than α-olefin. Such comonomer(s) other than α-olefin may include a non-conjugated polyene. Further, the α-olefin-based copolymer (a-4) may either be a random copolymer or a block copolymer.

Concrete examples of the α-olefin-based copolymer (a-4) include propylene-α-olefin-based copolymers (a-4a) and ethylene-α-olefin-based copolymers (a-4b). Among them, propylene-α-olefin-based copolymers (a-4a) are preferred.

When the α-olefin-based copolymer (a-4) used in the present invention is a propylene-α-olefin-based copolymer (a-4a), it may be one having a Mooney viscosity $ML_{1+4}$ (100° C.) of 60 to 250, preferably 65 to 200, more preferably 68 to 180 and a propylene content of 55 to 95 mole %, preferably 60 to 90 mole %, more preferably 68 to 90 mole %. Here, the propylene content means a propylene content to the total α-olefin content (including propylene).

The propylene-α-olefin-based copolymer (a-4a) may be a copolymer comprising propylene and α-olefin having 2 or 4 to 20, preferably 2 or 4 to 8 carbon atoms, and maybe copolymerized with comonomer(s) other than α-olefin. Such comonomer(s) other than α-olefin may include a non-conjugated polyene. Further, the propylene-α-olefin-based copolymer (a-4a) may either be a random copolymer or a block copolymer.

Concrete examples of the propylene-α-olefin-based copolymer (a-4a) include propylene-α-olefin copolymers and propylene-α-olefin-non-conjugated polyene copolymers. Among them, propylene-α-olefin copolymers are preferred.

As the α-olefin to be copolymerized with propylene in the propylene-α-olefin-based copolymer (a-4a), there may be enumerated, for example, ethylene, 1-butene, 1-pentene, 4-methyl-1-pentene, 1-hexene and 1-octene. The above-mentioned α-olefin may either be incorporated alone or in a combination of two or more.

As the non-conjugated polyene to be copolymerized with propylene and the above α-olefin in the propylene-α-olefin-based copolymer (a-4a), there may be enumerated, for example, non-conjugated diene, such as dicyclopentadiene, 1,4-hexadiene, cyclooctadiene, methylenenorbornene and ethylidenenorbornene. The non-conjugated polyene may either be incorporated alone or in a combination of two or more. The propylene-α-olefin-non-conjugated polyene copolymer has an iodine value usually in the range of 0.1 to 50, preferably in the range of 5 to 30.

When the α-olefin-based copolymer (a-4) is an ethylene-α-olefin-based copolymer (a-4b), as the α-olefin to be copolymerized with ethylene, there may be enumerated, for example, propylene, 1-butene, 1-pentene, 4-methyl-1-pentene, 1-hexene and 1-octene. The α-olefin may either be incorporated alone or in a combination of two or more.

In the ethylene-α-olefin-based copolymer (a-4b), as the non-conjugated polyene to be copolymerized with ethylene and the α-olefin, there may be enumerated, for example, non-conjugated dine, such as dicyclopentadiene, 1,4-hexadiene, cyclooctadiene, methylenenorbornene and ethylidenenorbornene. The non-conjugated polyene may either be incorporated alone or in a combination of two or more. The ethylene-α-olefin-non-conjugated polyene copolymer has an iodine value usually in the range of 0.1 to 50, preferably in the range of 5 to 30.

The α-olefin-based copolymer (a-4) may either be incorporated alone or in a combination of two or more.

Of the olefinic thermoplastic elastomer composition (A) used in the present invention, a composition composed of the polypropylene resin (a-3) and the α-olefin-based copolymer (a-4) is obtained preferably by subjecting a mixture containing 5 to 60% by weight, preferably 10 to 50% by weight of the polypropylene resin (a-3) and 40 to 95% by weight, preferably 50 to 90% by weight of the α-olefin-based copolymer (a-4) to the total amount of the above polypropylene resin (a-3) and the α-olefin-based copolymer (a-4) to a dynamic heat treatment in the absence of crosslinking agent as described below. When the contents of the polypropylene resin (a-3) and the α-olefin-based copolymer (a-4) are in the above-mentioned range, superior rubbery elasticity is exhibited.

Of the olefinic thermoplastic elastomer composition (A) used in the present invention, a composition composed of the polypropylene resin (a-3) and the α-olefin-based copolymer (a-4) may incorporate such a polyethylene resin that has been mentioned previously as the polyethylene resin (a-1). At that time the content of the polyethylene resin in the olefinic thermoplastic elastomer composition (A) is usually 30 parts by weight or less, preferably 2 to 30 parts by weight, more preferably 5 to 20 parts by weight to the total 100 parts by weight of the above polypropylene resin (a-3) and α-olefin-based copolymer (a-4)

The olefinic thermoplastic elastomer composition (A) according to the present invention exhibits a better rubbery elasticity without being crosslinked (vulcanized) using a crosslinking agent or crosslinking assistant. Further, the olefinic thermoplastic elastomer composition (A) which forms a substratum layer in the laminate of the present invention is not an elastomer of thermosetting type as a conventional vulcanized rubber but is an elastomer of thermoplastic type, so that it can be put to recycled use. There is no need for a crosslinking agent, so that no process step of kneading therewith is required and it can be obtained simply and efficiently in an economical way by only a single step of dynamic heat treatment.

The olefinic thermoplastic elastomer composition (A) used in the present invention may, on requirement, contain additives known per se, such as softening agent, heat stabilizer, age resistor, weather resisting agent, anti-static agent, filler, colorant and lubricant, within the extent not obstructing the purpose of the invention.

For the softening agent, there may be employed favorably those based on mineral oil. Such mineral oil based-softening agents may favorably include those based on paraffin, naphthene and aromatics which are employed commonly in rubber industry.

Production of Olefinic Thermoplastic Elastomer Composition (A)

The olefinic thermoplastic elastomer composition (A) according to the present invention can preferably be produced by mixing, in a specific proportion mentioned above, the above polyethylene resin (a-1), ethylene-α-olefin-based copolymer (a-2) and optionally incorporated resins and additives and by subjecting the mixture to dynamic heat treatment in the absence of crosslinking agent.

Further, the olefinic thermoplastic elastomer composition (A) according to the present invention can also be produced by mixing, in a specific proportion mentioned above, the above polypropylene resin (a-3), α-olefin-based copolymer (a-4) and optionally incorporated resins and additives and by subjecting the mixture to dynamic heat treatment in the absence of crosslinking agent.

Here, the word "dynamic heat treatment" means a technical measure, in which a composition comprising each component mentioned above, for example, the polyethylene resin (a-1), ethylene-α-olefin-based copolymer (a-2) and optionally incorporated resins and additives is melt-kneaded, namely, kneaded in a molten state. The dynamic heat treatment can be realized on a kneading apparatus, for example, a mixing roll, an intensive mixer, such as a Bumbury's mixer or kneader, and a kneading machine, such as a single screw extruder or a twin screw extruder, wherein it is preferable to employ a twin screw extruder. The dynamic heat treatment may favorably be realized in a kneading apparatus of non-open type in, preferably, an inert atmosphere, such as nitrogen gas.

The dynamic heat treatment may favorably be effected at a kneading temperature usually in the range from 150 to 280° C., preferably from 170 to 240° C. for duration in the range from 1 to 20 minutes, preferably 1 to 5 minutes. Usually, the shearing force appearing upon the kneading may favorably be in the range from 10 to $10^4$ sec$^{-1}$, preferably $10^2$ to $10^4$ sec.$^{-1}$ in terms of the shearing velocity.

When the dynamic heat treatment is effected using a twin screw extruder, it may preferably conducted under a condition satisfying the following provision ④:

④

$$4.8 < [(T-130)/100] + 2.2 \log P + \log Q - \log R < 7.0 \quad (2)$$

preferably $$5.0 < [(T-130)/100] + 2.2 \log P + \log Q - \log R < 6.8 \quad (2')$$

more preferably $$5.3 < [(T-130)/100] + 2.2 \log P + \log Q - \log R < 6.5 \quad (2'')$$

in which T represents the temperature (° C.) of the resin mixture at the die outlet of the twin screw extruder, P is the screw diameter (mm) of the twin screw extruder, Q is the maximum shearing velocity (sec$^{-1}$) at which the resin mixture is kneaded in the twin screw extruder and is defined by the formula Q=(P×π×S)/U with P being as above, S being the number of revolutions per second (rps) and U being the gap (mm) between the inner face of the barrel wall and the kneading segment of the screw at the narrowest portion thereof, and R is the extrusion through-put (kg/hr) of the twin screw extruder.

The olefinic thermoplastic elastomer composition obtained by the dynamic heat treatment on a twin screw extruder in the absence of crosslinking agent under the condition satisfying the provision (④) given above is superior in the tensile strength value, elongation set value, compression set value and appearance of the formed product made thereof.

The method for producing the olefinic thermoplastic elastomer composition (A) according to the present invention can produces an olefinic thermoplastic elastomer composition excellent in rubbery elasticity simply and efficiently by a single step, without using crosslinking agents such as organic peroxides and vulcanizing assistants such as divinyl compounds which are used in the manufacture of conventional vulcanized rubbers, by mixing, in a specified proportion described above, each component above-mentioned, for example, the above polyethylene resin (a-1) and the ethylene-α-olefin-based copolymer (a-2), or the above polyethylene resin (a-1) and the ethylene-α-olefin-based copolymer (a-2) and optionally added resins and additives and by subjecting the mixture to the dynamic heat treatment. There is no need for using a crosslinking agent and a vulcanizing assistant, so that there is required no complicated vulcanizing process step, and this can afford to produce the elastomer products at a low cost.

Ultra High Molecular Weight Polyolefin Composition (B)

In the laminated body of the present invention, the surface skin layer may comprise the ultra high molecular weight polyolefin composition (B), or the ultra high molecular weight polyolefin composition (B) and, on requirement, the olefinic thermoplastic elastomer composition (C) and the organopolysiloxane (D).

The ultra high molecular weight polyolefin composition (B) used in the present invention is, concretely, one having an intrinsic viscosity [η], determined in decalin at 135° C., in the range from 3.5 to 8.3 dl/g.

The ultra high molecular weight polyolefin composition (B) employed in the present invention may be a blend of an ultra high molecular weight polyolefin (b-1) having an intrinsic viscosity [η], determined in decalin at 135° C., in the range from 10 to 40 dl/g and a polyolefin (b-2) having an intrinsic viscosity [η], determined in decalin at 135° C., in the range from 0.1 to 5 dl/g. This blend may preferably contain the ultra high molecular weight polyolefin (b-1) in a proportion of 15 to 40% by weight per the total 100% by weight of the ultra high molecular weight polyolefin (b-1) and the polyolefin (b-2).

The above-mentioned ultra high molecular weight polyolefin and the polyolefin comprise a homopolymer of α-olefin, such as ethylene, propylene, 1-butene, 1-pentene, 1-hexene, 1-octene, 1-decene, 1-dodecene, 4-methyl-1-pentene and 3-methyl-1-pentene or a copolymer thereof, wherein preference is given to a homopolymer of ethylene and a copolymer of ethylene and other α-olefin(s) having a predominant component of ethylene.

The ultra high molecular weight polyolefin composition (B) may incorporate 1 to 20 parts by weight of a liquid or solid softening agent (lubricating oil) per the total 100 parts by weight of the ultra high molecular weight polyolefin (b-1) and the polyolefin (b-2).

For the liquid softening agent, mineral oil type softening agents and synthetic softening agents are used. Such mineral oil type softening agents include, concretely, petroleum base lubricating oil such as paraffin type and naphthene type, liquid paraffin, spindle oil, refrigerator oil, dynamo oil, turbine oil, machine oil and cylinder oil. As the synthetic softening agent, there are used synthetic hydrocarbon oil, polyglycol oil, polyphenyl ether oil, ester oil, phosphate oil, polychlorotrifluoroethylene oil, fluoroester oil, chlorinated biphenyl oil and silicone oil.

As the solid softening agent, graphite and molybdenum disulfide are mainly used, and, in addition, boron nitride, tungsten disulfide, lead oxide, glass powder and metal soap may also be employed. The solid softening agent can be used alone or in a combination with the liquid softening agent and can be incorporated in the ultra high molecular weight polyolefin in the form of, for example, powder, sol, gel and suspensoid.

The above ultra high molecular weight polyolefin composition (B) may incorporate, where deemed necessary, additives such as heat stabilizer, anti-static agent, weather resisting agent, age resistor, filler, colorant and lubricant, within the extent not obstructing the purpose of the present invention.

Olefinic Thermoplastic Elastomer Composition (C)

In the laminated material of the present invention, the olefinic thermoplastic elastomer composition (C), which is incorporated on requirement in the ultra high molecular weight polyolefin composition (B) to be used for the surface skin layer, is composed of a crystalline polyolefin resin and a rubber.

As the crystalline polyolefin resin used for the olefinic thermoplastic elastomer composition (C), there are enumerated homopolymers or copolymers of α-olefin having 2 to 20 carbon atoms.

Concrete examples of the above crystalline polyolefin resin include the following (co)polymers.

(1) Homopolymers of ethylene (made by any one of low pressure method or high pressure method)
(2) Copolymers of ethylene with other α-olefin(s) or with vinyl monomer, such as vinyl acetate and ethyl acrylate, in molar proportions of 10 mole % or less
(3) Homopolymers of propylene
(4) Random copolymers of propylene and other α-olefin in a molar ratio of 10 mole % or less
(5) Block copolymers of propylene and other α-olefin in a molar ratio of 30 mole % or less
(6) Homopolymers of 1-butene
(7) Random copolymers of 1-butene and other α-olefin in a molar ratio of 10 mole % or less
(8) Homopolymers of 4-methyl-1-pentene
(9) Random copolymers of 4-methy-1-pentene and other α-olefin in a molar ratio of 20 mole % or less.

The above-mentioned α-olefin includes, concretely, ethylene, propylene, 1-butene, 4-methyl-1-pentene, 1-hexene and 1-octene.

For the rubber used in the olefinic thermoplastic elastomer composition (C), though there is no restriction, rubbers of olefinic copolymer are preferable.

The above olefinic copolymer type rubbers are amorphous and random elastic copolymers with the major component of α-olefin of 2 to 20 carbon atoms, and include amorphous α-olefin copolymers comprising two or more α-olefins and α-olefin-non-conjugated diene copolymers comprising two or more α-olefins and non-conjugated diene.

Concrete examples of such olefinic copolymer type rubbers are given in the following.

(1) Rubbers of ethylene-α-olefin copolymer [Ethylene/α-olefin (mole ratio)=about 90/10 to 50/50]
(2) Rubbers of ethylene-α-olefin-non-conjugated diene copolymer [Ethylene/α-olefin (mole ratio)=about 90/10 to 50/50]
(3) Rubbers of propylene-α-olefin copolymer [Propylene/α-olefin (mole ratio)=about 90/10 to 50/50]
(4) Rubbers of butene-α-olefin copolymer [Butene/α-olefin (mole ratio)=about 90/10 to 50/50]

As the above-mentioned α-olefin, there are enumerated the same as those given as the concrete examples of the α-olefins constituting the above crystalline polyolefin resin.

As the above-mentioned non-conjugated diene, there are enumerated, concretely, dicyclopentadiene, 1,4-hexadiene, cyclooctadiene, methylenenorbornene and ethylidenenorbornene.

The Mooney viscosity $ML_{1+4}$ (100° C.) of these copolymer rubbers is preferably 10 to 250, more preferably 40 to 150. The iodine value is, if the above non-conjugated diene is copolymerized, preferably 25 or less.

The olefinic copolymer type rubber mentioned above may be present in any state of the crosslink, i.e., un-crosslinked state, partially crosslinked state and perfectly crosslinked state, in the thermoplastic elastomer. In the present invention, however, it is preferable to be present in the crosslinked state, particularly it is preferable to be present in the state of partial crosslink.

The rubber used for the olefinic thermoplastic elastomer composition (C) includes, other than the above olefinic copolymer type rubbers, other rubbers, for example, diene type rubbers such as styrene-butadiene rubbers (SBR), nitrile rubbers (NBR), natural rubbers (NR) and butyl rubbers (IIR); SEBS; and polyisobutylene.

In the olefinic thermoplastic elastomer composition (C) according to the present invention, the formulation ratio by weight of the crystalline polyolefin resin and the rubber (crystalline polyolefin resin/rubber) is usually in the range from 90/10 to 5/95, preferably from 70/30 to 10/90.

Further, when a combination of the olefinic copolymer type rubber and other rubber is employed as the rubber, the other rubber is incorporated usually in a proportion of 40 parts by weight or less, preferably 5 to 20 parts by weight per the total 100 parts by weight of the crystalline polyolefin resin and the rubber.

The olefinic thermoplastic elastomer composition (C) preferably used in the present invention is composed of a crystalline polypropylene, and an ethylene-α-olefin copolymer rubber or an ethylene -α-olefin-non-conjugated copolymer rubber. These are present in the partially crosslinked state in the olefinic thermoplastic elastomer composition (C), and in addition the proportion by weight of the crystalline polypropylene and the rubber (crystalline polypropylene/rubber) is in the range from 70/30 to 10/90.

The above olefinic thermoplastic elastomer composition (C) may incorporate, where deemed necessary, additives such as mineral oil type softening agent, heat stabilizer, anti-static agent, weather resisting agent, age resistor, filler, colorant and lubricant, within the extent not obstructing the purpose of the present invention.

Concrete examples of the olefinic thermoplastic elastomer composition (C) preferably used in the present invention include a thermoplastic elastomer which is obtained by mixing 70 to 10 parts by weight of a crystalline polypropylene (C-1), 30 to 90 parts by weight of an ethylene-propylene copolymer rubber or an ethylene-propylene-diene copolymer rubber (C-2) (the total sum of the components (C-1) and (C-2) being 100 parts by weight) and 5 to 100 parts by weight of a rubber (C-3) other than the above rubber (C-2) and/or a mineral oil type softening agent (C-4), and obtained by subjecting the mixture to dynamic heat treatment in the presence of an organic peroxide to make the crosslinking of the rubber (C-2) take place.

The organic peroxide mentioned above includes, concretely, dicumyl peroxide, di-tert-butyl peroxide, 2,5-dimethyl-2,5-di-(tert-butylperoxy)hexane, 2,5-dimethyl-2, 5-di-(tert-butylperoxy)hexyne-3, 1,3-bis(tert-butylperoxyisopropyl)benzene, 1,1-bis(tert-butylperoxy)-3, 3,5-trimethylcyclohexane, n-butyl 4,4-bis(tert-butylperoxy) valerate, benzoyl peroxide, p-chlorobenzoylperoxide, 2,4-dichlorobenzoyl peroxide, tert-butyl peroxybenzoate, tert-butylperoxyisopropylcarbonate, diacetyl peroxide, lauroyl peroxide and tert-butyl cumyl peroxide.

Of these, in the viewpoint of odor and scorch stability a-preferred are 2,5-dimethyl-2,5-di-(tert-butylperoxy)

hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane and n-butyl 4,4-bis(tert-butylperoxy)valerate. Among these, 1,3-bis(tert-butylperoxyisopropyl)benzene is most preferable.

In the olefinic thermoplastic elastomer composition (c), the organic peroxide is used in a ratio of usually 0.05 to 3 parts by weight, preferably 0.1 to 1 part by weight to the total 100 parts by weight of the crystalline polyolefin resin plus the rubber.

Upon crosslinking treatment by the above organic peroxides, there can be incorporated peroxy crosslinking aids such as sulfur, p-quinone dioxime, p,p'-dibenzoylquinone dioxime, N-methyl-N-4-dinitrosoaniline, nitrosobenzene, diphenylguanidine and trimethylolpropane-N,N'-m-phenylene dimaleimide, or divinylbenzene, triallyl cyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate.

By using the above compounds, uniform and mild crosslinking reaction can be expected. Particularly, in the present invention, divinylbenzene is most preferable. Divinylbenzene, since being easy to handle, since being good in compatibility with the crystalline polyolefin resin and the rubber which consitute the main component for crosslinking treatment, and since having a function of dissolving organic peroxides to work as dispersant thereof, produces the effect that the crosslinking by heat treatment is uniform to result in a thermoplastic elastomer composition balanced in flow and physical properties.

The compounds such as the above-mentioned crosslinking aids or polyfunctional vinyl monomers are used usually in a ratio of 0.1 to 2% by weight, preferably 0.3 to 1% by weight to the whole to be treated.

Here, the word "dynamic heat treatment" means a technical measure, in which a composition comprising each component mentioned above is melt-kneaded, namely, kneaded in a molten state. The dynamic heat treatment can be realized on a heretofore known kneading apparatus, for example, an open type apparatus such as mixing roll or a non-open type apparatus such as Bumbury's mixer, extruder, kneader and continuous mixer. Among these, a non-open type kneading apparatus is preferable and the kneading is preferably performed in an inert atmosphere, such as nitrogen gas and carbon dioxide gas.

The kneading may favorably be conducted at a temperature to make the half life of the organic peroxide to be used at a time shorter than one minute, usually in the range from 150 to 280° C., preferably from 170 to 240° C. for duration in the range usually from 1 to 20 minutes, preferably 3 to 10 minutes. The shearing force to be applied, in terms of the shearing velocity, is usually 100 sec$^{-1}$ or more, preferably is determined in the range from 500 to 10,000 sec$^{-1}$.

The thermoplastic elastomer composition (C) preferably used in the present invention is one that has partial crosslinking. The word "partial crosslinking" means the case where the gel content determined according to the method described below is in the range from 20 to 98% by weight, while "perfect crosslinking" means the case where the gel content is over 98% by weight. The thermoplastic elastomer composition (C) may preferably have a gel content in the range from 40 to 98% by weight.

Measurement of Gel Content:

A thermoplastic elastomer composition sample 100 mg is weighed, cut into small pieces of 0.5 mm×0.5 mm×0.5 mm, immersed in 30 ml cyclohexane in a closed container at 23° C. for 48 hours, then taken out on a filter paper and dried at room temperature for 72 hours or more until a constant weight is obtained. From the weight of the residue after drying there are subtracted the weights of all the cyclohexane insoluble components (fibrous filler, filler, pigment, etc.) other than the polymer component and the weight of the crystalline polyolefin resin in the sample before cyclohexane immersion. The value obtained thus is named "corrected final weight (Y)".

On the other hand, the weight of the rubber in the sample is named "corrected initial weight (X)".

The gel content (cyclohexane insoluble components) is obtained by the following formula.

Gel content [% by weight]=[corrected final weight (Y)/corrected initial weight (X)]×100.

The olefinic thermoplastic elastomer composition (C) used in the present invention is used usually in an amount of 90 to 10 parts by weight, preferably 80 to 15 parts by weight to the total 100 parts by weight of the ultra high molecular weight polyolefin composition (B) and the olefinic thermoplastic elastomer composition (C). This olefinic thermoplastic elastomer composition (C) has good flexibility, so that, when it is incorporated in the ultra high molecular weight polyolefin composition (B) in the above-mentioned extent and the resulting product is laminated on the substratum layer comprising the olefinic thermoplastic elastomer composition (A), no wrinkle appears on the surface skin layer even if the laminate is twisted or bent. Further, since it has a good flow property, the appearance of the formed laminate product is superior.

Organopolysiloxane (D)

The organopolysiloxane (D) used in the present invention includes, concretely, dimethylpolysiloxane, methylphenylpolysiloxane, fluoropolysiloxane, tetramethyltetraphenylpolysiloxane, methylhydrogenpolysiloxane and modified polysiloxanes, such as epoxy-modified, alkyl-modified, amino-modified, carboxyl-modified, alcohol-modified, fluorine-modified, alkylaralkylpolyether-modified and epoxypolyether-modified polysiloxanes. Among these, dimethylpolysiloxane is preferably used.

The organopolysiloxane (D) may preferably have a viscosity, determined according to the prescription of JIS K2283 at 25° C. of 10 to $10^7$ cSt. Those that have a viscosity [JIS K2283, 25° C.] of $10^6$ cSt or more, being very viscous, may be in the form of a masterbatch with the crystalline polyolefin resin to facilitate the dispersion into the ultra high molecular weight polyolefin composition (B).

The organopolysiloxane (D) can either be used only in one kind or in a combination of two or more kinds, according to its viscosity. Particularly, when it is used in a combination of two or more kinds, preferred is a combination of a low viscous organopolysiloxane having a viscosity of 10 to $10^6$ cSt and a high viscous organopolysiloxane having a viscosity of $10^6$ to $10^7$ cSt.

Such organopolysiloxanes (D) are used usually in the range from 0.1 to 25 parts by weight, preferably in the range from 1.5 to 20 parts by weight per the total 100 parts by weight of the ultra high molecular weight polyolefin composition (B) and/or the olefinic thermoplastic elastomer composition (C). Using the organopolysiloxane (D) in the above range can yield a product excellent in sliding property, abrasion resistance and scratch resistance.

The ultra high molecular weight polyolefin composition (B) permits the process of co-extrusion and lamination with the olefinic thermoplastic elastomer, and therefore, in manufacturing constructional gaskets of the present invention, it is possible to directly laminate the olefinic thermoplastic elastomer layer (substratum layer) and the ultra high molecular weight polyolefin layer, with elimination of the film (sheet) forming process, which produces a product economically.

Constructional Gasket and Glass-run Channel for Automobile Comprising Laminated Product The constructional gasket and automobile glass-run channel comprising the laminated product according to the present invention is constituted by a layer (substratum layer) comprising the olefinic thermoplastic elastomer composition (A) and a layer (surface skin layer (slippery resin layer)) comprising the ultra high molecular weight polyolefin composition (B).

The above constructional gasket and glass-run channel for automobile can be obtained by laminating the both layers mentioned above.

The method of laminating the layer of the thermoplastic elastomer composition (A) (hereinafter referred to as "(A) layer") and the layer of the ultra high molecular weight polyolefin composition (B) (hereinafter referred to as "(B) layer") is different according to the shape, size and required performance of gasket, and there may be enumerated, for example, the following lamination methods, though these are no-way restrictive.
(1) Method of heat fusing the (A) layer and (B) layer, which have been formed in advance, at a temperature or higher at which temperature at least one of the layers is molten, using a compression molding machine
(2) Method of extruding the (A) layer and (B) layer simultaneously and heat fusing them, using a multi-layer extrusion molding machine (co-extrusion forming).

In the present invention, it is generally preferable that the thickness of the (A) layer is 0.1 to 50 mm and that of the (B) layer is 5 μm to 10 mm.

In the above-mentioned constructional gasket and automobile glass-run channel, the layer comprising the olefinic thermoplastic elastomer composition (A) comprises the polyethylene resin (a-1) and the ethylene-α-olefin-based copolymer (a-2), or the polypropylene resin (a-3) and α-olefin-based copolymer (a-4), so that it exhibits superior rubbery elasticity and moldability.

Further, in the constructional gasket of the present invention, the layer comprising the ultra high molecular weight polyolefin composition (B) is excellent in abrasion resistance, scratch resistance, sliding property and chemical resistance.

Figure 1:
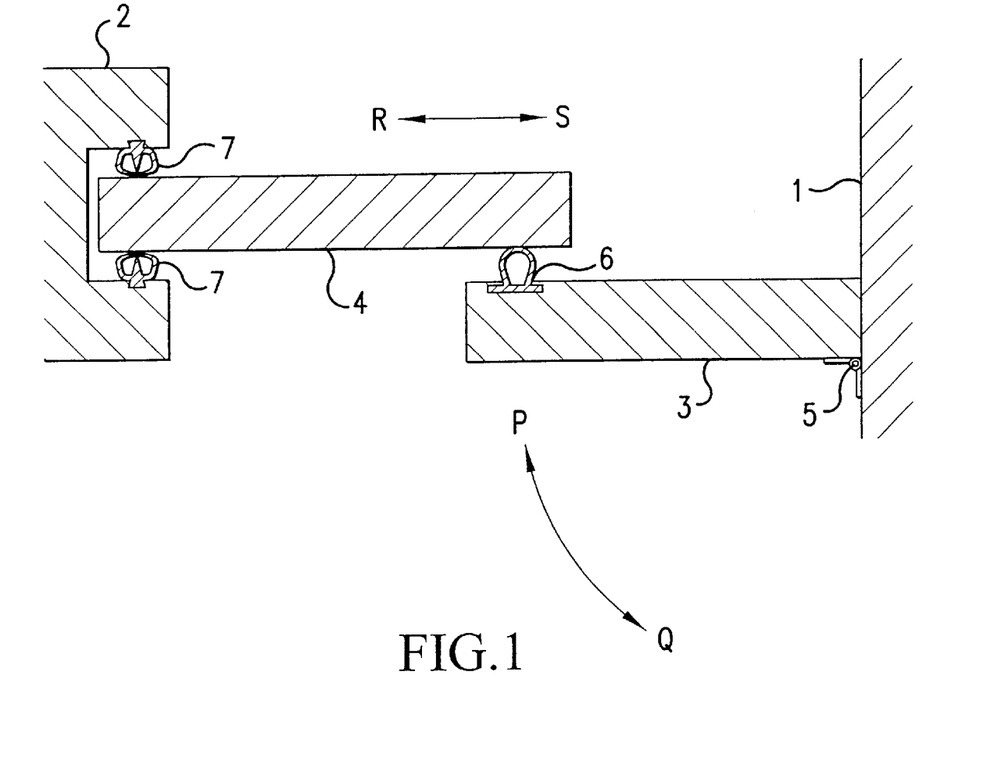
FIG. 1 is a schematic cross section to explain the application status of one example of the constructional gasket of the present invention.

FIG. 1 shows an application example of the constructional gasket of the present invention. Between wall 1 and wall 2 there are two doors, door 3 and door 4. Door 3 turns round toward the direction P-Q with hinge 5 being a supporting point and has gasket 6 on the contacting portion with door 4. On the other hand, door 4 moves toward the direction R-S and can tightly come into contact with door 3 by means of gasket 6 and with wall 2 by means of two gaskets 7.

Figure 2:
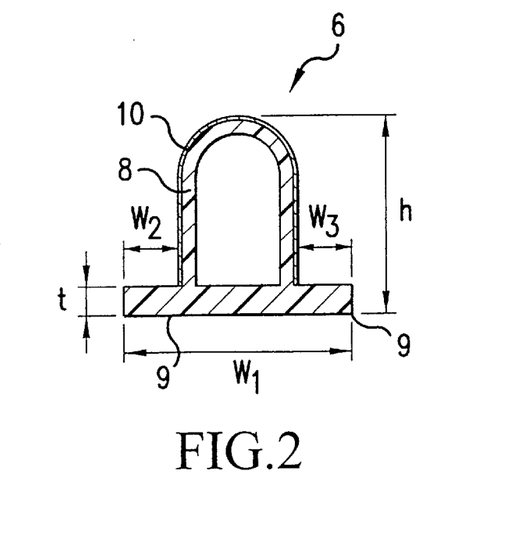
FIG. 2 is a cross section of gasket 6 in FIG. 1.

FIG. 2 shows a transverse cross section of gasket 6. Gasket 6 is constituted by substratum layers 8 and 9 comprising the thermoplastic elastomer composition (A) and surface skin layer (slippery resin layer) 10 comprising the ultra high molecular weight polyolefin composition (B), and the two layers are heat fused to have a sufficient strength. Of substratum layers 8 and 9 above, substratum layer 9 is a portion embedded in door 3. Gasket 6 makes door 3 contact door 4 when door 3 is closed and can retain the tightness between door 3 and door 4 when the door is locked with the U-shaped portion of the gasket deformed by compression.

The U-shaped portion of gasket 6 is deformed at the time of opening and closing of door 4 to retain the tightness between door 3 and door 4, and, since layer 10 comprising the ultra high molecular weight polyolefin composition (B) which has superior sliding property reduces significantly the power needed for the opening and closing, door 4 can be opened and closed lightly.

Figure 3:
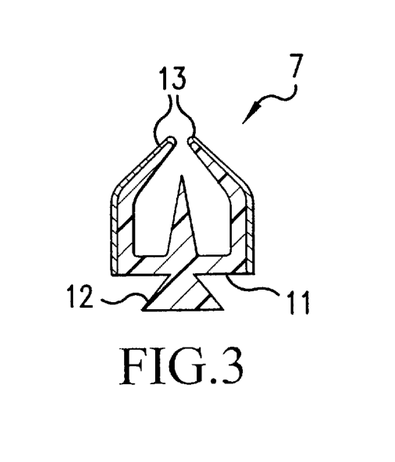
FIG. 3 is a cross section of gasket 7 in FIG. 1.

FIG. 3 shows a transverse cross section of gasket 7. Gasket 7 is constituted by substratum layers 11 and 12 comprising the thermoplastic elastomer composition (A) and surface skin layer (slippery resin layer) 13 comprising the ultra high molecular weight polyolefin composition (B), and the two layers are heat fused to have a sufficient strength. Of substratum layers 11 and 12 above, layer 12 is a portion embedded in wall 2. Gasket 7 is deformed at the fin portion of its tip when it comes into contact with door 4, and retains the tightness between wall 2 and door 4. For the fin portion of gasket 7, there are required sliding property and durability along with flexibility. For the surface layer of this portion, there is used the surface skin layer (slippery resin layer) 13 comprising the ultra high molecular weight polyolefin composition (B)which has excellent sliding property and durability, so that door 4 can be opened and closed lightly.

Figure 4:
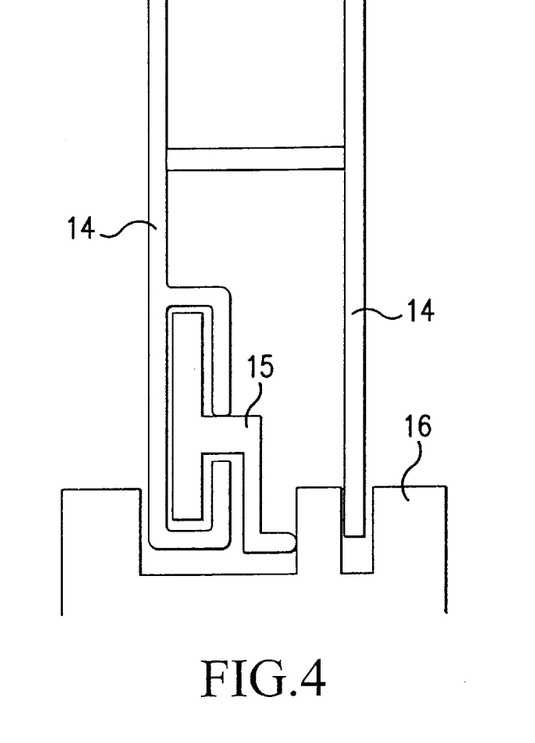
FIG. 4 is a schematic longitudinal section to explain the application status of one example of the constructional gasket of the present invention.

FIG. 4 shows another application example of the constructional gasket of the present invention. Aluminum sash frame 14 is installed with gasket 15 at its lower portion. Aluminum sash frame 14 can move on rail 16, and aluminum sash frame 14 and rail 16 can contact tightly by means of gasket 15.

Figure 5:
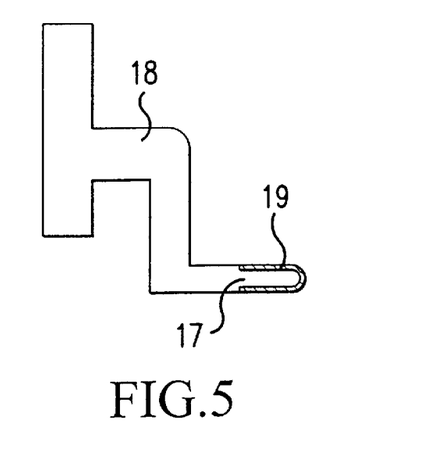
FIG. 5 is a longitudinal section of gasket 15 in FIG. 4.

FIG. 5 shows a cross section of gasket 15 above. Gasket 15 is constituted by substratum layers 17 and 18 comprising the thermoplastic elastomer composition (A) and surface skin layer (slippery resin layer) 19 comprising the ultra high molecular weight polyolefin composition (B), and the two layers are heat fused to have a sufficient strength. Surface skin layer (slippery resin layer) 19 can retain the tightness between aluminum sash frame 14 and rail 16 at the slide-contact portion on the side of rail 16.

Surface skin layer (slippery resin layer) 19 comprising the ultra high molecular weight polyolefin composition (B) which has excellent sliding property decreases significantly the force needed for movement of aluminum sash frame 14, and so aluminum sash frame 14 can be moved lightly.

Constructional Gasket Comprising Olefinic Thermoplastic Elastomer Composition (A)

The present invention also provides constructional gaskets comprising the above-mentioned olefinic thermoplastic elastomer composition (A).

The olefinic thermoplastic elastomer composition (A) used for the constructional gasket comprises, preferably, a polyethylene resin (a-1) and an ethylene-α-olefin-based copolymer (a-2) having a Mooney viscosity $ML_{1+4}$ (100° C.) of 90 to 250 and an ethylene content of 60 to 95 mole %, or a polypropylene resin (a-3) and an α-olefin-based copolymer (a-4) having a Mooney viscosity $ML_{1+4}$ (100° C.) of 60 to 250.

For the polyethylene resin (a-1) used for the constructional gasket of the present invention, widely known polyethylene resins can be used without any restriction, such as high density polyethylene, medium density polyethylene, linear low density polyethylene and low density polyethylene.

It is favorable that the polyethylene resin (a-1) has a density of 0.90 to 0.98 $g/cm^3$, preferably 0.90 to 0.95 $g/cm^3$.

The content of the polyethylene resin (a-1) in the olefinic thermoplastic elastomer composition (A) used in the present invention is usually 5 to 60 parts by weight, preferably 10 to 40 parts by weight to the total sum 100 parts by weight of the polyethylene resin (a-1) and the ethylene-α-olefin-based copolymer (a-2).

The content of the polypropylene resin (a-3) in the olefinic thermoplastic elastomer composition (A) used in the present invention is usually 5 to 60 parts by weight, preferably 10 to 40 parts by weight to the total sum 100 parts by weight of the polypropylene resin (a-3) and the α-olefin-based copolymer (a-4).

The ethylene-α-olefin-based copolymer (a-2) used in the present invention is one having a Mooney viscosity $ML_{1+4}$ (100 c) of 90 to 250 usually, 100 to 200 preferably and an ethylene content of 60 to 95 mole % usually, 72 to 85 mole % preferably. Here, the ethylene content means an ethylene content to the total content of α-olefins (including ethylene).

Other than the above-mentioned, for the olefinic thermoplastic elastomer composition (A) used for the constructional gasket of the present invention, the same description holds good which has previously been made on the olefinic thermoplastic elastomer composition (A) in explaining the laminate of the invention.

Figure 6:
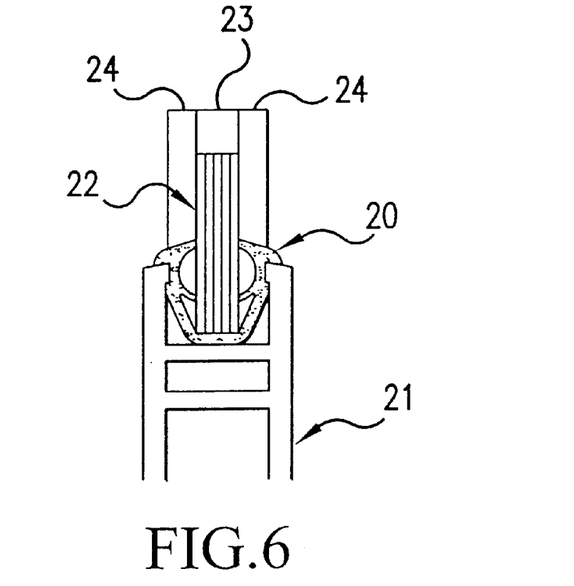
FIG. 6 is a drawing showing an application example of the grazing channel type of the constructional gasket of the present invention.
Figure 7:
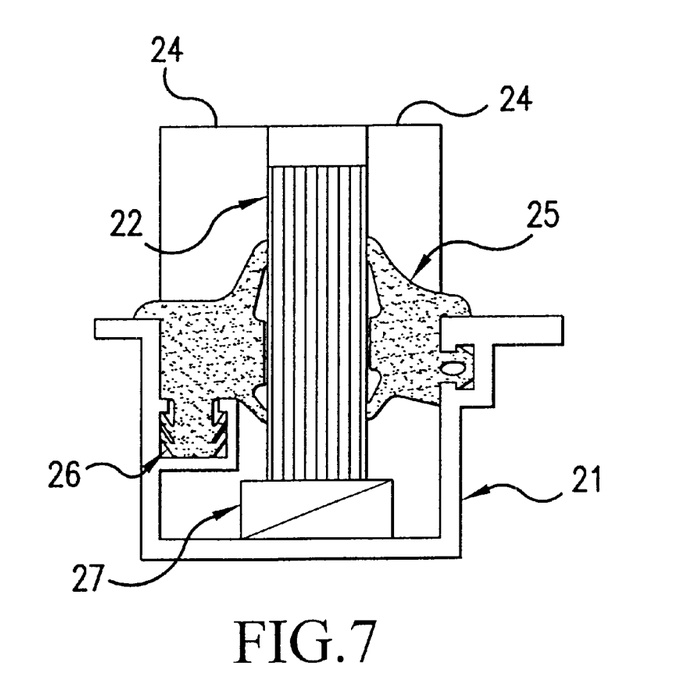
FIG. 7 is a drawing showing an application example of grazing bead type of the constructional gasket for double glasses of the present invention.

The constructional gasket of the present invention is obtained by molding the olefinic thermoplastic elastomer composition (A). The molding method thereof is not particularly limited, and, for example, usual extrusion molding and injection molding can be adopted. It is possible to perform the molding in a combination of the olefinic thermoplastic elastomer composition (A) with a hard olefinic thermoplastic elastomer or an olefinic resin. Among the constructional gasket, the grazing channel type and grazing bead type are used to fix the sash and the glass of a window, so that they are required to be interceptive against rain and to be air-tight. FIG. 6 shows an application example of the grazing channel type of constructional gasket according to the present invention. FIG. 7 shows that of the grazing bead type for double glasses.

The laminate of the present invention has superior abrasion resistance, durability and sliding property and also has superior rubbery elasticity. The constructional gasket and glass-run channel for automobile comprising the above-mentioned laminate have excellent abrasion resistance and sliding property and besides have excellent rubbery elasticity and mechanical properties, so that there occurs no permanent set in fatigue after a prolonged use. Further, the laminate of the present invention and the constructional gasket and the automobile glass-run channel comprising the laminate can be produced easily, and they are economical because they can be put to recycled use.

The constructional gasket comprising the olefinic thermoplastic elastomer composition (A) of the present invention can be produced easily and is economically good because it uses an olefinic thermoplastic elastomer composition capable of being reclaimed. Further, since it has superior rubbery elasticity and mechanical properties, it affords superior sealing property and air-tightness, with no occurrence of permanent set in fatigue after a long use.

This specification includes part or all of the contents as disclosed in the specifications of Japanese Patent Applications Nos. 11(1999)-311589 and 11(1999)-311602, which are the bases of the priority claim of the present application.

BRIEF DESCRIPTION OF THE DRAWINGS

Each numeral in FIGS. 1 to 5 means the following.

1, 2 - - - wall
3, 4 - - - door
5 - - - hinge
6, 7 - - - gasket
8, 9 - - - substratum layer comprising thermoplastic elastomer composition (A)
10 - - - surface skin layer (slippery resin layer) comprising ultra high molecular weight polyolefin composition (B)
11, 12 - - - substratum layer comprising thermoplastic elastomer composition (A)
13 - - - surface skin layer (slippery resin layer) comprising ultra high molecular weight polyolefin composition (B)
14 - - - aluminum sash frame
15 - - - gasket
16 - - - rail
17, 18 - - - substratum layer comprising thermoplastic composition (A)
19 - - - surface skin layer (slippery resin layer) comprising ultra high molecular weight polyolefin composition (B)

Each numeral in FIGS. 6 and 7 means the following.

20 - - - grazing channel
21 - - - sash
22 - - - glass
23 - - - thickness of glass plate
24 - - - surface clearance
25 - - - grazing bead set up previously
26 - - - grazing bead set up later
27 - - - setting block

DETAILED DESCRIPTION OF THE PREFERRED EMBODIMENTS

The present invention will be explained hereinafter by way of examples, which, however, should not be construed as limiting the scope of the present invention.

EXAMPLE 1

There were mixed by a Henschel mixer 30 wt. % of a linear low density polyethylene (density; 0.920 g/cm³, MFR; 2.1 g/10 min., ethylene content; 97.0 mole %, 4-methyl-1-pentene content; 3.0 mole %) and 70 wt. % of an ethylene-propylene-dicyclopentadiene copolymer rubber (ethylene content; 77 mole %, Mooney viscosity $ML_{1+4}$ (100° C.); 145, iodine value; 12). The mixture was subjected to dynamic heat treatment, using a twin screw extruder having a L/D of 30 and a screw diameter of 50 mm, in the nitrogen atmosphere at 220° C. and extruded to produce pellets of an olefinic thermoplastic elastomer composition (A-1). The olefinic thermoplastic elastomer composition (A-1) and the ultra high molecular weight polyethylene composition (B-1) having an intrinsic viscosity [η], determined in decalin at 135° C., of 7.0 dl/g and a density of 0.965 g/cm$^3$ were subjected to co-extrusion molding at a temperature of 230° C. to obtain the gasket of the present invention.

Here, the ultra high molecular weight polyethylene composition (B-1) is composed of 23 wt. % of an ultra high molecular weight polyethylene having an intrinsic viscosity [η] measured in decalin at 135° C., of 28 dl/g and 77 wt. % of a low molecular weight polyethylene having an intrinsic viscosity [η] measured in decalin at 135° C., of 0.73 dl/g.

The shape of the obtained gasket is shown in FIG. 2, the size of the gasket being 9.0 mm for $w_1$, 1.5 mm each for $w_2$ and $w_3$, 1.0 mm for t, 8.0 mm for h, 0.8 mm for the thickness of U-shaped portion and average 30 μm for the thickness of the ultra high molecular weight polyethylene layer.

The obtained gasket was installed as gasket 6 for door 3 shown in FIG. 1, and an endurance test was conducted by repeated openings and closings of door 4 made of 8 mm thick glass. As a result, the gasket endured the repeat test of 50,000 times and maintained the function as gasket.

EXAMPLE 2

Using 30 wt. parts of the linear low density polyethylene used in Example 1, 70 wt. parts of the ethylene-propylene-dicyclopentadiene copolymer rubber used in Example 1 and 40 wt. parts of a mineral oil type softening agent (paraffinic process oil made by Idemitsu Kosan Co. Ltd., trade name; Diana Process PW-380), an olefinic thermoplastic elastomer composition (A-2) was obtained in the same way as Example 1. Then, using the above composition and the ultra high molecular weight polyethylene composition (B-1) used in Example 1, a gasket was manufactured in the same way as Example land subjected to the endurance test.

As a result, the gasket endured the repeat test of 50,000 times and was maintaining the function as gasket.

EXAMPLE 3

Using 15 wt. parts of the linear low density polyethylene used in Example 1, 85 wt. parts of the ethylene-propylene-dicyclopentadiene copolymer rubber used in Example 1 and 20 wt. parts of a propylene homopolymer (MFR; 1.5 g/10 min.), an olefinic thermoplastic elastomer composition (A-3) was obtained in the same manner as Example 1. Then, using the above composition together with the ultra high molecular weight polyethylene composition (B-1) used in Example 1, a gasket was manufactured in the same manner as Example 1 and subjected to the endurance test. As a result, the gasket endured the repeat test of 50,000 times and was maintaining the function as gasket.

EXAMPLE 4

Using 30 wt. parts of the linear low density polyethylene used in Example 1 and 110 wt. parts of an oil-extended ethylene-propylene-dicyclopentadiene copolymer rubber which is obtained by incorporating 40 wt. parts of an extending oil (paraffinic process oil made by Idemitsu Kosan Co. Ltd., trade name; Diana Process PW-380) in the ethylene-propylene-dicyclopentadiene copolymer rubber used in Example 1, an olefinic thermoplastic elastomer composition (A-4) was obtained in the same way as Example 1. Then, using the above composition and the ultra high molecular weight polyethylene composition (B-1) used in Example 1, a gasket was manufactured in the same way as Example land subjected to the endurance test. As a result, the gasket endured the repeat test of 50,000 times and was retaining the function as gasket.

EXAMPLE 5

Using the olefinic thermoplastic elastomer composition (A-1) obtained in Example 1 and an ultra high molecular weight polyolefin composition obtained by kneading with a twin screw extruder 75 wt. parts of the ultra high molecular weight polyethylene composition (B-1) used in Example 1 and 25 wt. parts of an olefinic thermoplastic elastomer composition (C-1) mentioned below, a gasket was manufactured in the same manner as Example 1 and subjected to the endurance test. As a result, the gasket endured the repeat test of 50,000 times and was retaining the function as gasket.
[Olefinic Thermoplastic Elastomer Composition (C-1)]

Eighty parts by weight of an ethylene-propylene-5-ethylidenenorbornene copolymer rubber having an ethylene content of 70 mole %, an iodine value of 12 and a Mooney viscosity $ML_{1+4}$(100° C.) of 120 and twenty parts by weight of a polypropylene having a MFR of 13 g/10 min. and a density of 0.91 g/cm$^3$ were kneaded, using a Bumbury's mixer, in the nitrogen atmosphere at 180° C. for 5 minutes with a shearing velocity of 3,000 sec$^{-1}$. Then, the kneaded mass was formed into a sheet through a roll and cut with a sheet cutter to fabricate square pellets.

The pellets were blended with 0.3 wt. part of 1,3-bis(tert-butylperoxyisopropyl)benzene and 0.5 wt. part of divinyl-benzene using a Henschel mixer.

The mixture was extruded, using a twin screw extruder having a L/D of 40 and a screw diameter of 50 mm, in the nitrogen atmosphere at 220° C. to obtain a thermoplastic elastomer composition (C-1).

The gel content of the obtained thermoplastic elastomer composition (c-1) was 85 wt. % according to the previously mentioned method.

EXAMPLE 6

Using the olefinic thermoplastic elastomer composition (A-1) obtained in Example 1 and an ultra high molecular weight polyolefin composition obtained by kneading with a twin screw extruder 75wt. parts of the ultra high molecular weight polyethylene composition (B-1) used in Example 1, 25 wt. parts of the olefinic thermoplastic elastomer composition (C-1) obtained in Example 5 and 2 wt. parts of an organopolysiloxane (D-1) (made by Dow Corning Toray Silicone Co., Ltd., trade name; Silicone Oil SH 200, viscosity; 3000 cSt), a gasket was manufactured in the same manner as Example 1 and subjected to the endurance test. As a result, the gasket endured the repeat test of 50,000 times and was retaining the function as gasket.

EXAMPLE 7

Using the olefinic thermoplastic elastomer composition (A-1) obtained in Example 1 and an ultra high molecular weight polyolefin composition obtained by kneading with a twin screw extruder 75 wt. parts of the ultra high molecular weight polyethylene composition (B-1) used in Example 1, 25 wt. parts of the olefinic thermoplastic elastomer composition (C-1) obtained in Example 5, 2 wt. parts of the organopolysiloxane (D-1) used in Example 6 and 20 wt. parts of an organopolysiloxane (D-2) (made by Dow Corning Toray Silicone Co., Ltd., trade name; Silicone oil-polypropylene masterbatch BY27-002, containing 50 wt. % of ultra high molecular weight silicone oil), a gasket was manufactured in the same manner as Example 1 and subjected to the endurance test. As a result, the gasket endured the repeat test of 50,000 times and was retaining the function as gasket.

COMPARATIVE EXAMPLE 1

Using the gasket made of a conventional soft vinyl chloride resin the endurance test was conducted in the same manner as mentioned above. As a result, the contacting surface with the door was destroyed at a repeat of 22,000 times, and the friction drag between the door and the surface became markedly high, causing the gasket to be unfit for use.

EXAMPLE 8

The olefinic thermoplastic elastomer composition (A-1) of Example 1 and the ultra high molecular weight polyethylene composition (B-1) used in Example 1 were subjected to co-extrusion molding at 230 t to obtain a gasket having a sectional shape shown in FIG. 5. The average thickness of the surface skin layer (slippery resin layer) comprising the ultra high molecular weight polyethylene composition (B-1) was 0.1 mm. The obtained gasket was installed in an aluminum sash frame shown in FIG. 4, and the aluminum sash frame was made go and return repeatedly on a rail for the endurance test. As a result, the gasket endured the repeat test of 50,000 times and was maintaining the function as gasket.

COMPARATIVE EXAMPLE 2

Using the gasket made of a conventional hard vinyl chloride resin, the endurance test was conducted in the same manner as mentioned above. As a result, the gasket broke at the contacting surface with the rail at a repeat of 16,500 times, and the friction drag between the rail and the surface increased markedly, causing the gasket to be unfit for use.

EXAMPLE 9

There were mixed, with a Henschel mixer, 20 wt. % of a polypropylene having a MFR of 13 g/10 min. and a density of 0.91 g/cm$^3$ and 80 wt. % of a propylene-ethylene copolymer rubber having a propylene content of 68 mole % and a Mooney viscosity $ML_{1+4}$ (100° C.) of 75. Then, using a twin screw extruder having a L/D of 30 and a screw diameter of 50 mm, the mixture was subjected to dynamic heat treatment in the nitrogen atmosphere at 220° C. and extruded to obtain pellets of an olefinic thermoplastic elastomer composition (A-5).

Using this olefinic thermoplastic elastomer composition (A-5) and the ultra high molecular weight polyethylene composition (B-1) used in Example 1, a gasket was produced in the same manner as Example 1, and the endurance test was performed. The result was that the gasket endured the repeat test of 50,000 times and maintained the function as gasket.

Table 1 shows the conditions of the dynamic heat treatment in manufacturing the above olefinic thermoplastic elastomer compositions (A-1), (A-2), (A-3), (A-4) and (A-5), and the characteristics thereof.

TABLE 1

|  | A-1 | A-2 | A-3 | A-4 | A-5 |
|---|---|---|---|---|---|
| Components |  |  |  |  |  |
| PE | 30 | 30 | 15 | 30 |  |
| EPDM | 70 | 70 | 85 |  |  |
| PER |  |  |  |  | 80 |
| Oil - extended EPDM |  |  |  | 110 |  |
| PP |  |  | 20 |  | 20 |
| Paraffinic oil |  | 40 |  |  |  |
| Manufacturing Conditions |  |  |  |  |  |
| T | 223 | 222 | 239 | 225 | 223 |
| P | 50 | 50 | 50 | 50 | 50 |
| Q | 2800 | 2800 | 2800 | 2800 | 2800 |
| R | 50 | 50 | 50 | 50 | 50 |
| S | 280 | 280 | 280 | 280 | 280 |
| U | 15.7 | 15.7 | 15.7 | 15.7 | 15.7 |
| Value in formula (2) | 6.42 | 6.41 | 6.58 | 6.44 | 6.42 |
| Physical Properties |  |  |  |  |  |
| JIS A-hardness | 74 | 70 | 75 | 70 | 82 |
| Compression set (%) | 46 | 46 | 55 | 43 | 58 |
| Tensile strength (MPa) | 18 | 14 | 13 | 13 | 27 |
| Elongation set (%) | 10 | 9 | 7 | 7 | 11 |
| Value in formula (1) | 14.2 | 15.9 | 22.8 | 12.9 | 22.7 |

PE: Linear low density polyethylene

EPDM: Ethylene-propylene-dicyclopentadiene copolymer rubber

PER: Propylene-ethylene copolymer rubber

PP: Propylene homopolymer

T: Resin temperature at die outlet of twin screw extruder (c)

P: Screw diameter of twin screw extruder (mm)

Q: Maximum shearing velocity occurring in twin screw extruder (sec$^{-1}$)

R: Extrusion through-put of twin screw extruder (kg/h)

S: Screw revolution per second (rps)

U: Gap at narrowest portion between inner face of barrel wall and kneading segment of screw (mm)

$$[(T-130)/100]+2.2 \log P + \log Q - \log R \qquad \text{Formula (2)}$$

$$Y - 0.43X \qquad \text{Formula (1)}$$

wherein X denotes the JIS A-hardness value (dimensionless value) of olefinic thermoplastic elastomer composition, determined according to the prescription of JIS K6301, and Y denotes the compression set value (unit; %) of olefinic thermoplastic elastomer composition, determined at a condition of 70° C.×22 hours according to the prescription of JIS K6301.

The raw materials used in the manufacture of the olefinic thermoplastic elastomer compositions in the undermentioned Examples and Comparative Examples are as follows. The melt flow rate (MFR) values are ones determined, unless otherwise specified, at a condition of 190° C. and 2.16 kg load according to the prescription of ASTM D1238.

<<polyethylene resin (a-1)>>
(a-1-i) high density polyethylene
1) density; 0.954 g/cm$^3$
2) MFR; 0.8 g/10 min.
3) ethylene homopolymer (a-1-ii) linear low density polyethylene
1) density; 0.920 g/cm$^3$
2) MFR; 2.1 g/10 min.
3) ethylene content; 97.0 mole %, 4-methyl-1-pentene content; 3.0 mole %

(a-1-iii) linear low density polyethylene
1) density; 0.920 g/cm$^3$
2) MFR; 18 g/10 min.
3) ethylene content; 96.8 mole %, 4-methyl-1-pentene content; 3.2 mole %

(a-1-iv) low density polyethylene
1) density; 0.927 g/cm$^3$
2) MFR; 3 g/10 min.
3) ethylene homopolymer <<ethylene-α-olefin-based copolymer (a-2)>>
(a-2-i) ethylene-propylene-dicyclopentadiene copolymer rubber
1) ethylene content; 77 mole %
2) Mooney viscosity $ML_{1+4}$(100° C.); 145
3) iodine value; 12

(a-2-ii) ethylene-propylene-5-ethylidene-2-norbornene copolymer rubber
1) ethylene content; 82 mole %
2) Mooney viscosity $ML_{1+4}$(100 t); 15
3) iodine value; 10

(a-2-iii) ethylene-propylene-5-ethylidene-2-norbornene copolymer rubber
1) ethylene content; 68 mole %
2) Mooney viscosity $ML_{1+4}$(100° C.); 69
3) iodine value; 13

(a-2-iv) mixture of 70 wt. parts of the above ethylene-propylene-dicyclopentadiene copolymer rubber (a-2-i) and 40 wt. parts of extending oil (paraffinic oil made by Idemitsu Kosan Co. Ltd., trade name; Diana Process PW-380)

<<polypropylene resin (a-3)>>
(a-3-i) propylene homopolymer
1) density; 0.91 g/cm$^3$
2) MFR (ASTM D1238, 230° C., 2.16 kg load); 13 g/10 min.

<<propylene-α-olefin-based copolymer (a-4a)>>
(a-4-i) propylene-ethylene copolymer rubber
1) propylene content; 68 mole %
2) Mooney viscosity $ML_{1+4}$ (100° C.); 75

<<polypropylene resin (a-5)>>
(a-5-i) propylene homopolymer
1) density; 0.91 cm$^3$
2) MFR (ASTM D1238, 230° C., 2.16 kg load); 1.5 g/10 min.

<<mineral oil type softening agent>>
paraffinic oil: made by Idemitsu Kosan Co. Ltd., trade name; Diana Process PW-380

EXAMPLES 10 to 19

Each of the components was put in a Henschel mixer according to the formulations shown in Table 2 and they were mixed. The mixtures was dynamically heat treated and extruded in the nitrogen atmosphere at 220° C., using a twin screw extruder having a L/D of 30 and a screw diameter of 50 mm, to produce pellets of the olefinic thermoplastic elastomer compositions. The manufacturing conditions are shown in Table 2.

The hardness, compression set (70° C.×22 hours), tensile strength and elongation set values of these olefinic thermoplastic elastomer compositions were determined according to the prescription of JIS K6301. The results are shown in Table 2. Further, the endurance test (100° C.×3 days) was carried out according to the prescription of JIS A5756 (1997), and by the following calculation formulas the changes in hardness values, the rates of change in tensile strength values and the rates of change in elongation values were determined. The results are shown in Table 2.

Change in hardness value:

$$Hr=H_1-H_0$$

$H_0$; hardness value before aging, $H_1$; hardness value after aging

Rate of change in tensile strength value (%) (γF)

$$\gamma F=[(F_1-F_0)/F_0]\times 100$$

$F_0$; tensile strength value before aging, $F_0$; tensile strength value after aging Rate of change in elongation value at break (%) (γE):

$$\gamma E=[(E_1-E_0)/E_0]\times 100$$

$E_0$; elongation value at break before aging, $E_1$; elongation value at break after aging

COMPARATIVE EXAMPLES 3 TO 6

Except for using the components shown in Table 2 according to the formulas shown in Table 2, the same procedures were followed as in Examples. The results are shown in Table 2.

TABLE 2

|  |  | Example |  |  |  |  |  |  |
|---|---|---|---|---|---|---|---|---|
|  |  | 10 | 11 | 12 | 13 | 14 | 15 | 16 |
| Components | a-1-i | 30 |  |  |  |  |  |  |
|  | a-1-ii |  | 30 |  |  | 30 | 10 | 50 |
|  | a-1-iii |  |  | 30 |  |  |  |  |
|  | a-1-iv |  |  |  | 30 |  |  |  |
|  | a-2-i | 70 | 70 | 70 | 70 | 70 | 90 | 50 |
|  | a-2-ii |  |  |  |  |  |  |  |
|  | a-2-iii |  |  |  |  |  |  |  |
|  | a-2-iv |  |  |  |  |  |  |  |
|  | a-3-i |  |  |  |  |  |  |  |
|  | a-4-i |  |  |  |  |  |  |  |
|  | a-5-i |  |  |  |  |  |  |  |
|  | Paraffinic oil |  |  |  |  | 40 |  |  |
| Manufacturing Conditions | T | 230 | 223 | 222 | 223 | 222 | 235 | 232 |
|  | P | 50 | 50 | 50 | 50 | 50 | 50 | 50 |
|  | Q | 2800 | 2800 | 2800 | 2800 | 2800 | 2800 | 2800 |
|  | R | 50 | 50 | 50 | 50 | 50 | 50 | 50 |
|  | S | 280 | 280 | 280 | 280 | 280 | 280 | 280 |
|  | U | 15.7 | 15.7 | 15.7 | 15.7 | 15.7 | 15.7 | 15.7 |
|  | Value in formula (2) | 6.49 | 6.42 | 6.41 | 6.42 | 6.41 | 6.54 | 6.51 |
| Physical Properties | JIS A-hardness | 81 | 74 | 74 | 76 | 70 | 62 | 88 |
|  | Compression set (%) | 49 | 46 | 55 | 51 | 46 | 43 | 58 |
|  | Tensile str. (MPa) | 12 | 18 | 15 | 14 | 14 | 10 | 29 |
|  | Elongation set (%) | 18 | 10 | 10 | 11 | 9 | 9 | 16 |
|  | Value in formula (1) | 14.2 | 14.2 | 23.2 | 18.3 | 15.9 | 16.3 | 20.2 |
| Durability | Ratio of change in tens. str. (%) | −12 | −11 | −8 | −10 | −12 | −9 | −4 |
|  | Ratio of change in elong. (%) | −8 | −8 | −11 | −6 | −10 | −7 | −6 |
|  | Change in hardness | −2 | −3 | −3 | −4 | −2 | −2 | −3 |

|  |  | Example |  |  | Comparative Example |  |  |  |
|---|---|---|---|---|---|---|---|---|
|  |  | 17 | 18 | 19 | 3 | 4 | 5 | 6 |
| Components | a-1-i |  |  |  |  |  |  |  |
|  | a-1-ii | 30 | 15 |  | 30 | 30 | 70 |  |
|  | a-1-iii |  |  |  |  |  |  |  |
|  | a-1-iv |  |  |  |  |  |  |  |
|  | a-2-i |  | 85 |  |  |  | 30 | 70 |
|  | a-2-ii |  |  |  | 70 |  |  |  |
|  | a-2-iii |  |  |  |  | 70 |  |  |
|  | a-2-iv | 110 |  |  |  |  |  |  |
|  | a-3-i |  |  | 20 |  |  |  |  |
|  | a-4-i |  |  | 80 |  |  |  |  |
|  | a-5-i |  | 20 |  |  |  |  | 30 |
|  | Paraffinic oil |  |  |  |  |  |  |  |
| Manufacturing Conditions | T | 225 | 238 | 223 | 222 | 225 | 230 | 235 |
|  | P | 50 | 50 | 50 | 50 | 50 | 50 | 50 |
|  | Q | 2800 | 2800 | 2800 | 2800 | 2800 | 2800 | 2800 |
|  | R | 50 | 50 | 50 | 50 | 50 | 50 | 50 |
|  | S | 280 | 280 | 280 | 280 | 280 | 280 | 280 |
|  | U | 15.7 | 15.7 | 15.7 | 15.7 | 15.7 | 15.7 | 15.7 |
|  | Value in formula (2) | 6.44 | 6.57 | 6.42 | 6.41 | 6.44 | 6.49 | 6.54 |
| Physical Properties | JIS A-hardness | 70 | 77 | 82 | 84 | 68 | 91 | 91 |
|  | Compression set (%) | 43 | 57 | 58 | 66 | 72 | 69 | 87 |
|  | Tensile str. (MPa) | 13 | 13 | 27 | 11 | 2 | 35 | 4 |
|  | Elongation set (%) | 7 | 11 | 11 | 19 | 20 | 29 | 32 |
|  | Value in formula (1) | 12.9 | 23.9 | 22.7 | 29.9 | 42.8 | 29.9 | 47.9 |
| Durability | Ratio of change in | −11 | −8 | −10 | −20 | −12 | −12 | −10 |

TABLE 2-continued

| | | | | | | | |
|---|---|---|---|---|---|---|---|
| tens. str. (%) | | | | | | | |
| Ratio of change in elong. (%) | −9 | −8 | −9 | −18 | −18 | −11 | −9 |
| Change in hardness | −2 | −3 | −2 | −6 | −4 | −4 | −6 |

T: Resin temperature at die outlet of twin screw extruder (C)
P: Screw diameter of twin screw extruder (mm)
Q: Maximum shearing velocity occurring in twin screw extruder (sec$^{-1}$)
R: Extrusion through-put of twin screw extruder (kg/h)
S: Screw revolution per second (rps)
U: Gap at narrowest portion between inner face of barrel wall and kneading segment of screw (mm)

[(T−130)/100]+2.2 log P+log Q−log R      Formula (2)

Y−0.43X      Formula (1)

wherein X denotes the JIS A-hardness value (dimensionless value) of olefinic thermoplastic elastomer composition, determined according to the prescription of JIS K6301, and Y denotes the compression set value (unit; %) of olefinic thermoplastic elastomer composition, determined at a condition of 70° C.×22 hours according to the prescription of JIS K6301.

All the publications, patents and patent applications cited herein are incorporated herein by reference in their entirety.

What is claimed is:

1. A laminate comprising an olefinic thermoplastic elastomer which comprises:
   (a) a substratum layer comprising an olefinic thermoplastic elastomer composition (A) having the following characteristics ① to ③:

①

$9 \leq Y-0.43X \leq 27$      (1)

wherein X denotes the JIS A-hardness value, a dimensionless value, of the olefinic thermoplastic elastomer composition determined according to the prescription of JIS K6301 and Y represents the compression set value, expressed by %, of the olefinic thermoplastic elastomer composition determined according to the prescription of JIS K6301 under a condition of 70° C. and 22 hours, ② a tensile strength value in the range from 5 to 30 MPa determined according to the prescription of JIS K6301 and ③ elongation set value of 18% or less determined according to the prescription of JIS K6301, and (b) a surface skin layer comprising an ultra high molecular weight polyolefin composition (B) having an intrinsic viscosity [η] measured in decalin at 135° C. in the range from 3.5 to 8.3 dl/g.

2. A laminate as defined in claim 1, wherein said olefinic thermoplastic elastomer composition (A) is obtainable by dynamically heat treating 5 to 60 parts by weight of a polyethylene resin (a-1) and 40 to 95 parts by weight of an ethylene-α-olefin-based copolymer (a-2) having a Mooney viscosity ML$_{1+4}$ (100° C.) of 90 to 250 and an ethylene content of 70 to 95 mole, wherein the total amount of (a-1) and (a-2) is 100 parts by weight.

3. A laminate as defined in claim 2, wherein said olefinic thermoplastic elastomer composition (A) contains 30 parts by weight or less of a polypropylene resin (a-5) to the total amount 100 parts by weight of the polyethylene resin (a-1) and the ethylene-α-olefin-based copolymer (a-2).

4. A laminate as defined in claim 1, wherein said olefinic thermoplastic elastomer composition (A) is obtainable by dynamically heat treating 5 to 60 parts by weight of a polypropylene resin (a-3) and 40 to 95 parts by weight of an o-olefin-based copolymer (a-4) having a Mooney viscosity ML$_{1+4}$(100° C.) of 60 to 250, wherein the total amount of (a-3) and (a-4) is 100 parts by weight.

5. A laminate as defined in claim 1, wherein said ultra high molecular weight polyolefin composition (B) is an ultra high molecular weight polyolefin composition comprising an ultra high molecular weight polyolefin (b-1) having an intrinsic viscosity [η] measured in decalin at 135° C. in the range from 10 to 40 dl/g and a polyolefin (b-2) having an intrinsic viscosity [η] measured in decalin at 135° C. in the range from 0.1 to 5 dl/g, and the ultra high molecular weight polyolefin (b-1) is present in a ratio of 15 to 40% by weight to the total amount 100% by weight of the ultra high molecular weight polyolefin (b-1) and the polyolefin (b-2).

6. A laminate as defined in claim 1, wherein the surface skin layer comprising said ultra high molecular weight polyolefin composition (B) is composed of 10 to 90 parts by weight of the ultra high molecular weight polyolefin composition (B) and 90 to 10 parts by weight of an olefinic thermoplastic elastomer composition (C) comprising a crystalline polyolefin resin and a rubber, wherein the total amount of (B) and (C) is 100 parts by weight.

7. A laminate as defined in claim 1, wherein the surface skin layer comprising said ultra high molecular weight polyolefin composition (B) is composed of 10 to 90 parts by weight of the ultra high molecular weight polyolefin composition (B), 90 to 10 parts by weight of the olefinic thermoplastic elastomer composition (C) comprising a crystalline polyolefin resin and a rubber and 0.1 to 25 parts by weight of an organopolysiloxane (D).

8. A glass-run channel for automobile comprising a laminate as defined in claim 1.

9. A constructional gasket comprising a laminate as defined in claim 1.

10. A constructional gasket comprising an olefinic thermoplastic elastomer composition (A) having the following characteristics ① to ①:

①

$9 \leq Y-0.43X \leq 27$      (1)

wherein X denotes the JIS A-hardness value, a dimensionless value, of the olefinic thermoplastic elastomer composition determined according to the prescription of JIS K6301 and Y represents the compression set value, expressed by %, of the olefinic thermoplastic elastomer composition determined according to the prescription of JIS K6301 under a condition of 70° C. and 22 hours, ② a tensile strength value in the range from 5 to 30 MPa determined according to the prescription of JIS K6301, and ③ an elongation set value of 18% or less determined according to the prescription of JIS K6301.

11. A constructional gasket as defined in claim 10, wherein said olefinic thermoplastic elastomer composition (A) is obtainable by dynamically heat treating 5 to 60 parts by weight of a polyethylene resin (a-1) and 40 to 95 parts by weight of an ethylene-α-olefin-based copolymer (a-2) having a Mooney viscosity $ML_{1+4}(100°\ C.)$ of 90 to 250 and an ethylene content of 60 to 95 mole %, wherein the total amount of (a-1) and (a-2) is 100 parts by weight.

12. A constructional gasket as defined in claim 11, wherein said olefinic thermoplastic elastomer composition (A) contains 30 parts by weight or less of a polypropylene resin (a-5) to the total amount 100 parts by weight of the polyethylene resin (a-1) and the ethylene-α-olefin-based copolymer (a-2).

13. A constructional gasket as defined in claim 10, wherein said olefinic thermoplastic elastomer composition (A) is obtainable by dynamically heat treating 5 to 60 parts by weight of a polypropylene resin (a-3) and 40 to 95 parts by weight of an α-olefin-based copolymer (a-4) having a Mooney viscosity $ML_{1+4}(100°\ C.)$ of 60 to 250, wherein the total amount of (a-3) and (a-4) is 100 parts by weight.

* * * * *